United States Patent [19]

Suzuki et al.

[11] Patent Number: 4,507,765
[45] Date of Patent: Mar. 26, 1985

[54] OPTICAL TRACK SCANNER

[76] Inventors: Junichi Suzuki; Keiji Maruta; Kazutaka Noborimoto; Satoshi Hineno, all of c/o Sony Corporation, 7-35 Kitashinagawa, 6-chome, Shinagawa-ku, Tokyo, Japan

[21] Appl. No.: 369,669

[22] Filed: Apr. 19, 1982

[30] Foreign Application Priority Data

Apr. 20, 1981 [JP] Japan ................................ 56-60432

[51] Int. Cl.$^3$ ................................................. G11B 7/00
[52] U.S. Cl. ........................................ 369/45; 369/44
[58] Field of Search ............................... 369/43–46, 369/112; 250/201, 202; 350/252, 255

[56] References Cited

U.S. PATENT DOCUMENTS

| 4,021,101 | 5/1977 | Camerik ......................... 369/45 X |
| 4,032,776 | 6/1977 | Van Rosmalen ................. 369/45 X |
| 4,092,529 | 5/1978 | Aihara et al. |
| 4,135,083 | 1/1979 | Van Alem et al. |
| 4,135,206 | 1/1979 | Kleuters et al. |
| 4,367,543 | 1/1983 | Araki et al. ......................... 369/45 |

FOREIGN PATENT DOCUMENTS 0026109 4/1981 European Pat. Off. .............. 369/45

Primary Examiner—Aristotelis M. Psitos

[57] ABSTRACT

In an optical disc player or other apparatus in which a light beam is directed against a record medium surface for optically reading video or audio information recorded in a track on such surface; an optical scanning assembly is provided with an objective lens interposed in the path of the light beam with its optical axis coinciding substantially with such path therethrough, a lens holder including a first tubular member having the objective lens mounted therein and a second tubular member supporting the first member for rectilinear sliding movement relative thereto in a first direction parallel to the optical axis, a base member supporting the second tubular member of the lens holder for rectilinear sliding movement relative thereto in a second direction at right angles to the first direction, for example, in a direction across or along the track in which information is recorded, first and second coils mounted on the lens holder and being independently energizable, and permanent magnets for producing magnetic flux in linking relation to the first and second coils which are oriented so that energizing of one of the coils is controllable for effecting movements of the objective lens relative to the record medium in the direction of the optical axis for thereby focusing the light beam at the record medium surface and energizing of the other coil is controllable for effecting movement of the objective lens in the second direction whereby to correct for scanning or time base errors.

11 Claims, 8 Drawing Figures

OPTICAL TRACK SCANNER

BACKGROUND OF THE INVENTION

1. Field of the Invention

This invention relates generally to an apparatus, such as an optical disc player, in which a light beam is directed against a record medium surface for optically reading information recorded in a track on such surface, and more particularly is directed to an optical scanning assembly for such apparatus.

2. Description of the Prior Art

It is known to provide an optical disc player with a focusing servo by which the light beam from a laser light source is correctly focused on the disc surface through an objective lens, and also with a tracking servo by which the point of impingement of the focused light beam on the disc surface is made to coincide with the track being scanned or read. In one known form of such optical disc player, the objective lens is mounted in a tubular lens holder which is guided for movement in the axial direction in response to electromagnetically applied forces for achieving the focusing servo function, and a galvano-mirror is interposed in the optical path of the light beam and is pivotally mounted on a rubber or other elastic support so as to be angularly displaceable by electromagnetically applied forces for achieving the tracking servo function. In such known arrangement, the focusing servo and tracking servo functions are performed with independent components, that is, the axially movable objective lens and the pivoted galvano-mirror, respectively, so that it is difficult to embody the same in a truly compact optical scanning assembly and to achieve reliable optical alignment of the various components. Further, the angular displacement of the galvano-mirror for effecting correction of tracking errors causes the displaced light beam to be incident on the objective lens at an angle to the optical axis, and this requires the use of a relatively expensive lens for correcting aberrations over a relatively wide range. Furthermore, in the case where rubber is used as the elastic support for the galvano-mirror, aging of the rubber will cause the characteristics of the support to vary with time and thereby vary the tracking servo performance.

In another known arrangement for performing the focusing servo and tracking servo functions, the objective lens is mounted in a tubular body or holder which is supported by pairs of leaf springs so that the objective lens can be displaced, in response to suitably applied electromagnetic forces, in respective directions substantially parallel to the optical axis of the objective lens and substantially at right angles thereto for achieving the focusing servo and the tracking servo functions, respectively. However, in such arrangement, when a tracking correction is effected, the optical axis of the objective lens may deviate angularly from its desired normal relationship to the surface of the record disc. Therefore, once again, the light beam may be incident on the objective lens at an angle to the optical axis thereof and it is necessary to use a relatively expensive objective lens corrected for aberrations over a relatively wide range away from the optical axis. Further, since the holder for the objective lens is supported by springs, resonance may result and, therefore, it is difficult to obtain reliable servo action over a wide range.

OBJECTS AND SUMMARY OF THE INVENTION

Accordingly, it is an object of this invention to provide an optical disc player or other apparatus in which an optical scanning assembly directs a light beam against a record medium surface for optically reading information recorded in a track thereon, and in which the optical scanning assembly avoids the above mentioned disadvantages of the prior art.

More specifically, it is an object of this invention to provide an optical scanning assembly, as aforesaid, which may be made compact, and in which an objective lens is employed for correcting focusing and tracking or time base errors.

Another object is to provide an optical scanning assembly, as aforesaid, in which correction for tracking or time base errors by means of the objective lens is effected in such a way as to avoid incidence of the light beam on the objective lens at an angle to the optical axis of the latter, whereby to permit the use of a relatively inexpensive objective lens.

In accordance with an aspect of this invention, in an apparatus directing a light beam against a record medium surface for optically reading information recorded in a track on such surface; an optical scanning assembly comprises lens means interposed in the path of the light beam with the optical axis of such lens means coinciding substantially with the path of the light beam therethrough, lens holding means including a first member having the lens means mounted therein and a second member supporting the first member for rectilinear sliding movement relative thereto in a first direction, base means supporting the second member of the lens holding means for rectilinear sliding movement relative thereto in a second direction at right angles to said first direction, said base means being disposed in respect to the record medium surface so that one of the first and second directions is parallel to the optical axis, first and second coil means mounted on the lens holding means and being independently energizable, and magnetic means for producing magnetic flux in linking relation to the first and second coil means which are oriented so that energizing of the first coil means is controllable for effecting movement of the lens means relative to the base means in said one direction parallel to the optical axis and thereby focusing the light beam at the record medium surface and energizing of the other coil means is controllable for effecting movement of the lens means relative to the base means in the other of the first and second directions, and thereby correcting either tracking errors or time base errors.

The above, and other objects, features and advantages of the invention, will be apparent in the following detailed description of an illustrative embodiment of the invention which is to be read in connection with the accompanying drawings, wherein the same reference numerals are employed to identify corresponding parts in the various views.

DESCRIPTION OF A PREFERRED EMBODIMENT

Figure 1:
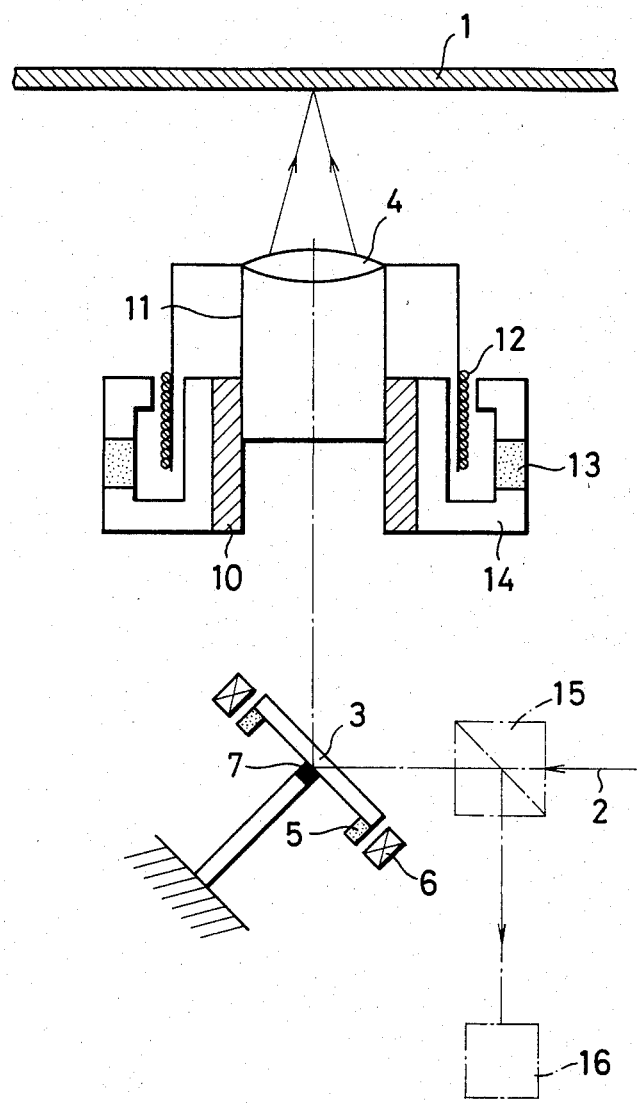
FIG. 1 is a diagrammatic sectional view showing essential parts of an optical disc player according to the prior art.

In order that the advantages of this invention may be fully appreciated, an optical disc player with an optical scanning assembly according to the prior art will first be described with reference to FIG. 1. As there shown, a record medium in the form of a disc 1 has video, audio or other information signals recorded thereon in the form of arrays of protrusions or recesses along a track on the surface of disc 1 which is suitably rotated about its center. A light beam 2 is generated by a laser source (not shown) and passes through a beam splitter 15 so as to be reflected by a galvano-mirror 3 for travel through an objective or focusing lens 4 in a path which is normal to the surface of record disc 1. The objective lens 4 is provided for focusing light beam 2 substantially at the surface of disc 1 as the latter is rotated. The focused light beam, upon being reflected from the surface of disc 1 is returned through objective lens 4 and again reflected by galvano-mirror 3 so as to be directed into beam splitter 15 which now reflects the returned light beam for impingement on a photo-sensitive detector or transducer 16. The reflected light beam is modulated by the information signal recorded in the scanned track on disc 1 so that the output of transducer 16 is similarly modulated to reproduced or play back the recorded signal. The record track being scanned on disc 1 may be one turn of a continuous spiral, and the laser generating light beam 2, beam splitter 15, mirror 3, lens 4 and transducer 16 may all be included in a head or scanning assembly which is moved radially as a unit, in respect to the axis of rotation of disc 1 in synchronism with the rotation of the latter so that the focused light beam approximately tracks or follows the spiral record track on disc 1. Further, the light beam reflected from disc 1 may be made to contain, in addition to the reproduced video or audio signal, information concerning focusing of the light beam in respect to the surface of disc 1 and also information concerning tracking of the record track by the light beam. In a known manner, such focusing and tracking information may be detected by parts of transducer 16 and employed to provide focusing and tracking servo or error signals in response to which lens 4 is displaced in the direction of its optical axis and mirror 3 is pivoted, respectively. More specifically, galvano-mirror 3 is shown to have a permanent magnet 5 mounted thereon proximate to a stationary coil 6, and mirror 3 is pivotally mounted on an elastic support member 7, for example, of rubber or the like. When a tracking servo or error signal is applied to coil 6, mirror 3 is suitably deflected angularly so that the spot at which light beam 2 impinges on record disc 1 is displaced in the radial direction of the latter for correcting a tracking error. Further, in the optical scanning assembly according to the prior art, focusing lens 4 is mounted in a tubular holder 11 which is axially slidable in a stationary guide member 10. A coil 12 is wound about a cylindrical bobbin joined to lens holder 11, and a magnet 13 is interposed in a yoke structure 14 to produce magnetic flux in linking relation to coil 12. Thus, the application of a focusing servo or error signal to coil 12 is effective to cause displacement of lens 4 in the direction of its optical axis for correcting focusing errors.

Since axial displacements of lens 4 are employed for correcting focusing errors and pivotal or angular movements of mirror 3 are employed for correcting tracking errors, it is difficult to make compact the optical scanning assembly according to the prior art and to achieve accurate alignment of the respective optical elements thereof. Further, since mirror 3 is pivoted to angularly deflect light beam 2 for correcting tracking errors, the light beam becomes incident on lens 4 at an angle to the optical axis of the latter so that lens 4 has to be expensively designed for correcting aberrations over a relatively wide range from its optical axis. Furthermore, since rubber is conventionally used as the pivoted support 7 for galvano-mirror 3, aging of such material is likely to cause changes, with time, of the operating characteristics of the tracking error servo.

Figure 2:
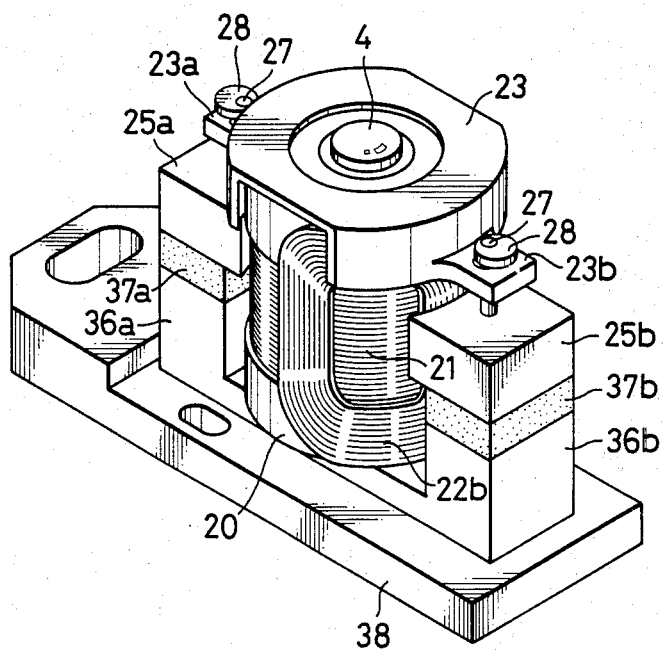
FIG. 2 is a perspective view of an optical scanning assembly according to an embodiment of the present invention.
Figure 3:
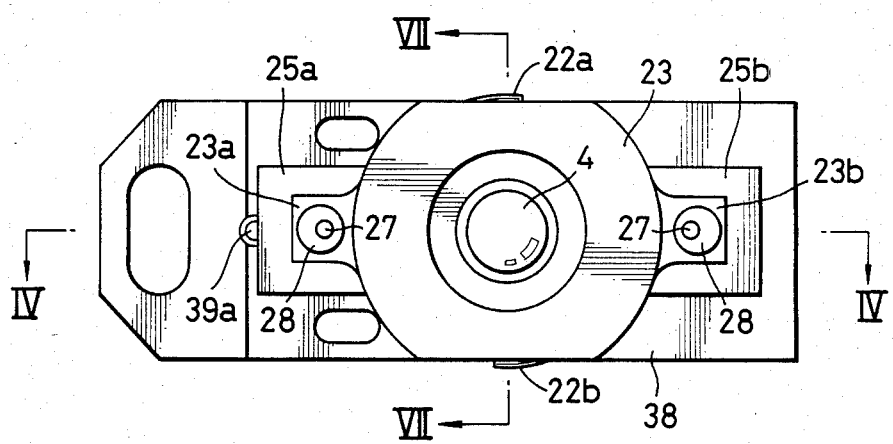
FIG. 3 is a top plan view of the optical scanning assembly of FIG. 2.
Figure 4:
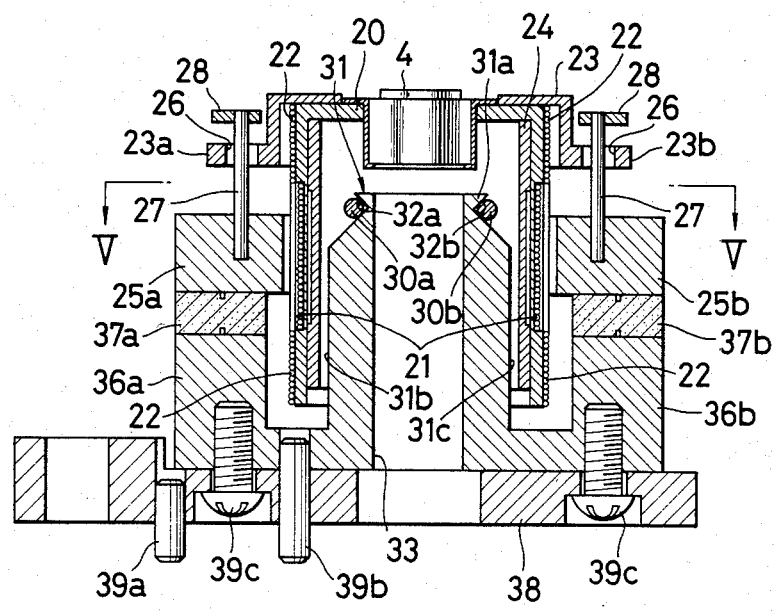
FIG. 4 is a vertical sectional view taken along the line IV—IV on FIG. 3.

Referring now to FIGS. 2-4, it will be seen that, in an optical scanning assembly according to an embodiment of this invention, focusing lens 4 is supported by a lens holding means which includes an outer tubular member 20 having a centrally apertured upper end wall in which lens 4 is secured, and an inner tubular member 24 which is slidable, at least axially, within outer tubular member 20. At least outer tubular member 20 holding lens 4 is formed of a non-magnetic material, such as, aluminum, and also serves as a bobbin for a focusing coil 21 and for an additional coil 22 formed of a plurality of windings 22a and 22b (FIGS. 5 and 6) by which lens 4 can be moved in a direction at right angles to its optical axis, as hereinafter described in detail.

A cover 23 of a synthetic resin is suitably secured on the upper end of tubular member 20 and has oppositely directed ears 23a and 23b extending therefrom. Such ears 23a and 23b have holes 26 extending therethrough to loosely receive pins 27 which extend parallel to the coincident axes of tubular members 20 and 24, and which are anchored, at their lowered ends, in pole pieces 25a and 25b. Caps 28 are secured on the upper end of pins 27 above ears 23a and 23b for limiting the movement of lens 4 with cylindrical member 20 in the direction of the axis of the latter, that is, in the direction of the optical axis of the lens, while the clearance between holes 26 and pins 27 defines the limits of the possible movements of lens 4 with member 20 in directions perpendicular to the optical axis of lens 4.

Figure 8:
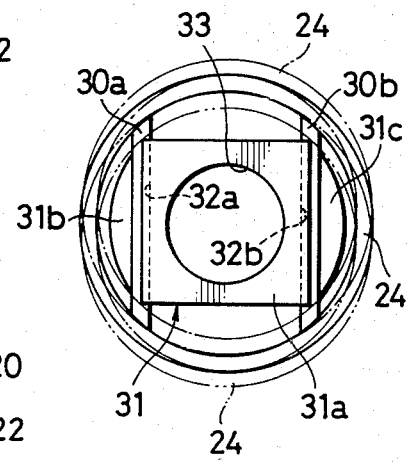
FIG. 8 is a fragmentary plan view illustrating movements of a guide member for the lens holder in the optical scanning assembly of FIG. 2.

The inner tubular member 24 is held against movement in the direction of the optical axis of lens 4 while being guided for rectilinear movement in a direction perpendicular to such optical axis. More particularly, two parallel guide rods 30a and 30b extend across inner tubular member 24 at opposite sides of, and parallel to a diammetrical plane of member 24, and the opposite ends of such rods 30a and 30b are suitably secured to member 24. These guide rods 30a and 30b are slidably engaged in guide grooves 32a and 32b of V-shaped cross-section extending across opposed faces of an approximately square upper end portion 31a of a yoke 31 which extends upwardly within tubular member 24. Thus, tubular members 20 and 24 and objective lens 4 are movable at right angles to the optical axis of the lens in a direction parallel to guide rods 30a and 30b. As shown on FIGS. 5, 7 and 8, there is substantial clearance between yoke 31 and the inner surface of tubular member 24 in the direction in which guide rods 30a and 30b extend so as to permit the relative movement in that direction. However, below the approximately square upper end portion 31a of yoke 31, the latter is formed with arcuate flanks 31b and 31c which extend relatively close to the inner surface of tubular member 24 at diammetrically opposed locations at right angles to the directions of guide rods 30a and 30b. The yoke 31 is further shown to have a central bore 33 extending therethrough parallel with the optical axis of lens 4 to permit the passage of the laser light beam therethrough.

Figure 5:
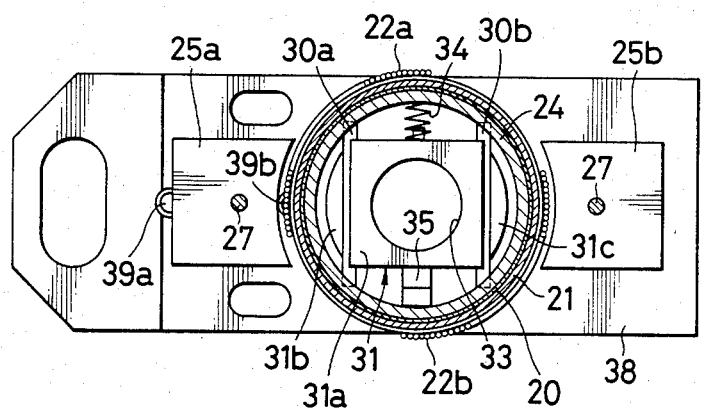
FIG. 5 is a sectional view taken along the line V—V on FIG. 4.
Figure 7:
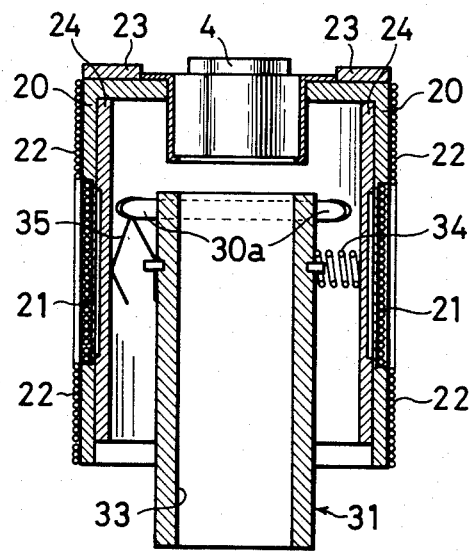
FIG. 7 is a transverse sectional view taken along the line VII—VII on FIG. 3.

Inner tubular member 24, and hence outer tubular member or lens holder 20 and lens 4, are yieldably urged to a neutral position, that is, a position in which yoke 31 is centered within tubular member 24 in the direction parallel to guide rods 30a and 30b, by means of a helical or coil spring 34 and a leaf spring 35 which are interposed between the inner surface of tubular member 24 and yoke 31 at the opposite sides of the latter, as shown on FIGS. 5 and 7.

Yoke 31 is particularly shown on FIG. 4 to be constituted by a central, upstanding portion of a generally E-shaped base member of ferro-magnetic material which is inclued in a magnetic circuit of the optical scanning assembly. More particularly, such base member further includes side portions 36a and 36b directed upwardly at the sides of yoke 31 defined by arcuate flanks 31b and 31c, respectively, and being spaced from the latter to define gaps therebetween in which tubular members 20 and 24 with coils 21 and 22 are movably received. Magnets 37a and 37b are suitably secured to the upper end surfaces of side portions 36a and 36b of the base member, and pole pieces 25a and 25b are, in turn, secured on top of magnets 37a and 37b. As shown particularly on FIG. 5, pole pieces 25a and 25b have arcuate surfaces facing toward member 20 so as to reduce the distance between such pole pieces and coils 21 and 22 on tubular member 20. The base member including yoke 31 is fixedly secured, as by locating pins 39a and 39b and screws 39c (FIG. 4) on a mounting plate 38 which can be suitably mounted, for example, for movement in the radial direction of the record disc in response to the rotation of the latter so that the light beam substantially scans or follows a spiral track in which the information signal is recorded on the record disc.

Figure 6:
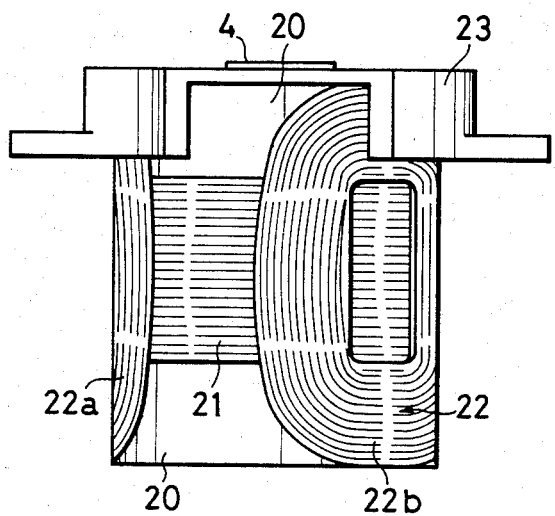
FIG. 6 is an elevational view of a lens holder included in the optical scanning assembly of FIG. 2, and which also functions as a coil bobbin.

As shown particularly on FIG. 6, coil 21 is wound circumferentially about the outer surface of tubular member of lens holder 20 at the central portion of the latter which is interposed between pole pieces 25a and 25b and flanks 31b and 31c of yoke 31. Thus, coil 21 is in efficient interlinking relation with the magnetic flux due to magnets 37a and 37b which extends horizontally across the gaps between pole pieces 25a and 25b and flanks 31b and 31c, respectively, of yoke 31. Accordingly, the application of a focusing servo or error signal to coil 21 causes the resulting current flowing through the latter to interact with the magnetic flux for providing a driving force moving tubular member 20, and with it objective lens 4, either upwardly or downwardly parallel to the optical axis of the lens for correcting the focus of the light beam at the record medium surface.

As shown on FIGS. 5 and 6, coil 22 includes a pair of windings 22a and 22b adhered to the surface of tubular member 20 in overlying relation to coil 21. Each of windings 22a and 22b is wound so as to be substantially rectangular in shape and thereby have substantially straight side portions extending axially on tubular member 20 and curving top and bottom portions extending circumferentially over approximately one-quarter of the circumferential extent of tubular member 20. Further, windings 22a and 22b are diammetrically opposed relative to each other on tubular member 20 so that, with pins 27 substantially centered in holes 26, an axially extending substantially straight portion of coil 22a is disposed between pole piece 25a and flank 31b of yoke 31, and a diammetrically opposed axially extending substantially straight portion of winding 22b is disposed between pole piece 25b and flank 31c of yoke 31. Furthermore, windings 22a and 22b of coil 22 are suitably connected to each other so that, when an error signal is applied thereto, the resulting current flow in windings 22a and 22b interacts with the magnetic flow between pole pieces 25a and 25b and yoke 31 to produce a driving force perpendicular to the optical axis of lens 4, that is, parallel to the direction of guide rods 30a and 30b. If mounting plate 38 is disposed so that rods 30a and 30b extend at right angles to the direction along the record track being scanned, for example, in the radial direction of a record disc, then the application of tracking error or servo signal to windings 22a and 22b of coil 22, and the resulting displacement of tubular member 20 and lens 4 in the direction of guide rods 30a and 30b is effective to displace the point of impingement of the light beam on the record medium in the direction transverse to the track for correcting a tracking error. However, it will be appreciated that mounting plate 38 can be alternatively arranges so that guide rods 30a and 30b extend parallel to the direction along the record track being scanned, for example, parallel to the tangent to the point on a spiral record track at which the light beam is scanning the latter. In the latter case, the servo or error signal applied to coil 22 is effective to displace the point of impingement of the light beam in the direction along the record track, for example, to correct a time base error in the information signal being reproduced.

It will be apparent that, in the above described optical scanning assembly according to the invention, the objective lens 4 can be independently moved in both the direction of its optical axis for focusing and in a direction at right angles to the optical axis for either tracking or time base error correction. Since many components of the described optical scanning assembly are common to both the focusing function and the tracking or time base error correcting function, the optical scanning assembly can be made relatively compact and light in weight. Furthermore, since lens 4 is moved rectilinearly both in the direction parallel to its optical axis for focusing and in the direction at right angles thereto for correcting either the tracking or time base error, the light beam is always incident on lens 4 in a direction parallel to the optical axis thereof. Therefore, in designing and producing lens 4 only aberrations near the optical axis thereof need to be corrected, with the result that the design and construction of objective lens 4 can be simplified to reduce the cost thereof.

It is also to be noted that, since the optical scanning assembly embodying the present invention dispenses with the galvano-mirror 3 of the prior art shown on FIG. 1, the problem of degrading of the elastic characteristics of the rubber support 7 for such mirror 3 is avoided. Further, since movements of objective lens 4 in the direction of its optical axis for focusing control are simply guided by the rectilinear sliding of outer tubular member 20 relative to inner tubular member 24, the problems of intrinsic or mutual resonance which arise when the lens is supported by leaf springs or the like are avoided. By avoiding such problems of resonance, the optical scanning assembly according to this invention achieves more precise and stable control of the focusing by objective lens 4. Finally, it will be seen that the guiding of all movements of objective lens 4 by rectilinear sliding of tubular member 20 relative to tubular member 24 and by rectilinear sliding of guide rods 30a and 30b in guide grooves 32a and 32b facilitates the relative adjustment and alignment of the optical components in the scanning assembly.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In an apparatus directing a light beam against a record medium surface for optically reading information recorded in a track on such surface; an optical scanning assembly comprising lens means interposed in the path of said light beam with an optical axis of said lens means coinciding substantially with said path of the light beam therethrough, lens holding means including a first member having said lens means mounted therein and a second member supporting said first member for rectilinear sliding movement relative thereto in a first direction, base means supporting said second member of the lens holding means for rectilinear sliding movement relative thereto in a second direction at right angles to said first direction, said base means being disposed in respect to the record medium surface so that one of said first and second directions is parallel to said optical axis, first and second coil means mounted on said lens holding means and being independently energizable, and magnetic means for producing magnetic flux in linking relation to said first and second coil means which are oriented so that energizing of one of said coil means is controllable for effecting movement of said lens means relative to said base means in said one direction and thereby focusing said light beam at said record medium surface and energizing of the other of said coil means is controllable for effecting movement of said lens means relative to said base means in the other of said first and second directions.

2. An apparatus as in claim 1; in which said record medium is in the form of a disc which is rotated about the center thereof, said track is substantially circular and concentric with said disc, said optical axis of the lens means is substantially normal to said record medium surface, and said other direction extends substantially radially in respect to said center of the disc so that said movements of the lens means in said other direction are effective to correct for tracking errors of said light beam in respect to said track.

3. An apparatus as in claim 1; in which said record medium is in the form of a disc which is rotated about the center thereof, said track is substantially circular and concentric with said disc, said optical axis is substantially normal to said record medium surface, and said other direction extends substantially tangentially in respect to said track so that said movements of the lens means in said other direction are effective to correct time base errors in the information that is read.

4. An apparatus as in claim 1; in which said first and second coil means are mounted on said first member of the lens holding means.

5. An apparatus as in claim 1; in which said first and second members are tubular and relatively slidable one within the other in said first direction which corresponds to the axes of said tubular members, said first and second coil means are mounted on the outer one of said tubular members, and the inner one of said tubular members and said base means have cooperatively engaging guide means for directing said inner member to move in said second direction relative to said base means.

6. An apparatus as in claim 5; in which said base means has a central portion extending axially into said inner tubular member, and said guide means includes guide rods extending across said inner tubular member parallel to a diametrical plane thereof and guide grooves in said central portion of the base means extending parallel to said second direction and slidably receiving said guide rods.

7. An apparatus as in claim 5; in which said base means is of magnetic material and further includes side portions extending outwardly in respect to said outer tubular member and being diametrically opposed, said magnetic means are included in said side portions of the base means, and said side portions terminate in pole pieces at the level of said first and second coil means on said outer tubular member.

8. An apparatus as in claim 7; in which said base means further includes a bottom portion from which said central portion and said side portions extend integrally upward and said central portion reaches approximately to the level of said pole pieces to provide a yoke for return of said flux.

9. An apparatus as in claim 7; in which said first coil means includes a winding extending circumferentially around said outer tubular member, and said second coil means includes a pair of coils having substantially straight coil portions extending axially on said outer tubular member at diametrically opposed locations so as to be proximate to said pole pieces.

10. An apparatus as in claim 9; further comprising means for limiting movements of said lens means in said first and second directions.

11. An apparatus as in claim 10; further comprising means yieldably urging said lens means to a neutral position in respect to movements thereof in said second direction.

* * * * *